(12) United States Patent
Mornacchi et al.

(10) Patent No.: US 12,523,311 B2
(45) Date of Patent: Jan. 13, 2026

(54) THERMAL COMPENSATED PRESSURE RELIEF VALVE USING SHAPE MEMORY MATERIALS FOR HIGH TEMPERATURE APPLICATION

(71) Applicant: Microtecnica S.r.l., Turin (IT)

(72) Inventors: Andrea Mornacchi, Turin (IT);
Federico Rombola', Drapia (IT);
Matteo Cappo, Turin (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 18/796,890

(22) Filed: Aug. 7, 2024

(65) Prior Publication Data

US 2025/0052331 A1 Feb. 13, 2025

(30) Foreign Application Priority Data

Aug. 10, 2023 (EP) ..................................... 23425039

(51) Int. Cl.
*F16K 17/06* (2006.01)
*F03G 7/06* (2006.01)

(52) U.S. Cl.
CPC ............ *F16K 17/06* (2013.01); *F03G 7/0614* (2021.08)

(58) Field of Classification Search
CPC ............ F03G 7/0614; F16K 2200/304; F16K 31/002; F16K 5/026; F16K 17/06
See application file for complete search history.

(56) References Cited

U.S. PATENT DOCUMENTS

| 1,944,518 | A | * | 1/1934 | Lovekin | ................ F16K 17/383 137/538 |
| 4,836,496 | A | | 6/1989 | Abujudom et al. | |
| 5,411,049 | A | * | 5/1995 | Colvard | .................. E21B 21/10 137/71 |
| 6,039,030 | A | | 3/2000 | Robinson et al. | |
| | | | (Continued) | | |

FOREIGN PATENT DOCUMENTS

| DE | 10223025 A1 | 12/2002 |
| DE | 102015209162 A1 | 4/2016 |
| JP | 2007298271 A | 11/2007 |

OTHER PUBLICATIONS

Abstract for DE102015209162 (A1); Published: Apr. 28, 2016, 1 page.

(Continued)

*Primary Examiner* — P. Macade Nichols
(74) *Attorney, Agent, or Firm* — CANTOR COLBURN LLP

(57) ABSTRACT

A pressure relief valve, PRV, includes an inlet and an outlet defining a fluid flow path therebetween and a plunger. The plunger is moveable between a closed position and an open position, wherein, in the closed position, the plunger blocks the fluid flow path, and, in the open position, fluid may flow through the fluid flow path, wherein pressure at the inlet applies an opening force on the plunger, urging the plunger towards the open position. The PRV also includes a biasing means configured to apply a biasing force to the plunger, thereby biasing the plunger towards the closed position such that, when the biasing force is greater than the opening force, the plunger remains in the closed position, and when the opening force is greater than the biasing force and the plunger moves to the open position.

15 Claims, 5 Drawing Sheets

(56) References Cited

U.S. PATENT DOCUMENTS

| | | | |
|---|---|---|---|
| 6,135,135 | A | 10/2000 | Futa, Jr. et al. |
| 9,702,473 | B2 * | 7/2017 | Nomichi ................. F16K 24/04 |
| 10,384,786 | B2 | 8/2019 | Greenberg et al. |
| 10,598,293 | B2 | 3/2020 | Pearson et al. |
| 2019/0093205 | A1 | 3/2019 | Savino et al. |
| 2019/0170266 | A1 | 6/2019 | Quaglia et al. |

OTHER PUBLICATIONS

Abstract for DE10223025 (A1); Published: Dec. 5, 2002, 1 page.
Abstract for JP2007298271 (A); Published: Nov. 15, 2007, 1 page.
European Search Report for Application No. 23425039.7, mailed Jan. 24, 2024, 10 pages.

* cited by examiner

THERMAL COMPENSATED PRESSURE RELIEF VALVE USING SHAPE MEMORY MATERIALS FOR HIGH TEMPERATURE APPLICATION

CROSS-REFERENCE TO RELATED APPLICATIONS

This application claims the benefit of European Patent Application No. 23425039.7 filed Aug. 10, 2023, the disclosure of which is incorporated herein by reference in its entirety.

FIELD

This invention relates generally to the field of pressure relief valves. More specifically, the present invention relates to the use of shape memory materials to provide thermal compensation for pressure relief valves.

BACKGROUND

Pressure relief valves (PRVs) for pneumatic applications are widely used in several industrial fields, in particular PRVs for high temperature fluids are used in several applications related to aircraft engines and nacelles. Pneumatic systems in nacelles and engines typically have a very wide operating ranges both in terms of pressure and temperature (for example, from ambient temperature to around 650° C.).

Generally, PRVs can perform one or more of a variety of functions. For example, PRVs may find use in pressure limitation (i.e. to avoid over pressure conditions in the pneumatic system by releasing pressure when it exceeds a threshold). PRVs may also find use in pressure regulation (i.e. where PRVs are used in combination with in-line valves so as to control the downstream pressure in anti-ice or start bleed systems), and/or they be used for pressure stabilization, in minimising pressure oscillation due to operating conditions within a volume/duct. For example, PRVs may be used to limit pressure within a duct, or provide pressure regulation on anti-ice valves (AIVs).

The use of PRVs allow for ducts and other components of the system to be more optimally sized, and therefore allows for a weight reduction in the overall system. In order to provide a PRV with a consistent performance across a wide range of temperatures is to have an electronically actuated PRV. However, such valves tend to be much heavier than simpler, mechanical valves, owing to the much greater requirement for additional sensors, control and wiring. It would therefore be desirable to provide a simple PRV that has consistent performance across a wide range of operating temperatures.

SUMMARY

According to a first aspect, there is provided a pressure relief valve, PRV, comprising an inlet and an outlet defining a fluid flow path therebetween. The PRV further comprises a plunger, the plunger being moveable between a closed position and an open position, wherein, in the closed position, the plunger blocks the fluid flow path, and, in the open position, fluid may flow through the fluid flow path, wherein pressure at the inlet applies an opening force on the plunger, urging the plunger towards the open position; a biasing means configured to apply a biasing force to the plunger, thereby biasing the plunger towards the closed position such that, when the biasing force is greater than the opening force, the plunger remains in the closed position, and when the opening force is greater than the biasing force and the plunger moves to the open position; and a variable preload means, the variable preload means configured to apply a preload to the biasing means so as to increase the biasing force, wherein the variable preload means comprises a shape memory material such that, above a transition temperature of the shape memory material, the variable preload means changes shape so as to apply a higher preload to the biasing means.

As would be appreciated, a shape memory material is a material that is configured to change shape from a first shape when its temperature is below a transition temperature of the shape memory material, to a second shape when its temperature is above the transition temperature, and vice versa. In this way, the variable preload means may advantageously utilise such a property so that, above a certain temperature, it may apply a higher preload to the biasing means. This allows for compensation for degradation in the biasing force provided by the biasing means at a higher temperature, and therefore lead to a recovery of the cracking pressure of the PRV. Therefore, it is possible to provide a simple and light PRV that has consistent performance across a wide range of operating temperatures.

The biasing means may comprise a spring, may comprise a retaining means configured to retain the spring, and the retaining means may comprise a bush and nut. Such an arrangement is a simple PRV arrangement, and degradation in the stiffness of the spring with an increase in temperature may be at least somewhat compensated by the shape memory material.

The variable preload means may be configured to elongate above the threshold temperature, thereby applying a higher preload to the biasing means. The variable preload means may comprise a washer. Such an arrangement is again a simple, and light arrangement that advantageously utilises shape memory material properties to adjust the preload of the biasing means.

The PRV may be a PRV for use in high temperature pneumatic applications for aircraft engines and/or nacelles. Whilst the PRV may find use in many applications, it may be particularly suitable for applications in aircraft engines and/or nacelles which have a wide range of operating temperatures.

The shape memory material may comprise a Nickel/Titanium, nitinol, alloy, such as Ni 49.9/Ti 50.1, Ni 49.0/Ti 51, and/or Ni 48.0/Ti 52. The shape memory material may have a transition temperature of 190° C.

In the closed position, the plunger may be configured to seal against an inlet seat, thereby closing the fluid flow path. The PRV may further comprise a plunger support, wherein the biasing means may configured to bias against the plunger support.

According to a second aspect, there is provided a system comprising: a duct, and the PRV of the first aspect, wherein the inlet is in fluid communication with the duct, such that when the pressure in the duct increases above a threshold pressure, the plunger is configured to move to the open position, thereby allowing fluid flow through the fluid flow path, releasing pressure within the duct.

According to a third aspect, there is provided a system comprising: an anti-ice valve, and the PRV of the first aspect, wherein the inlet is in fluid communication with the AIV such that the PRV is configured to provide pressure regulation to the AIV.

According to a third aspect, there is provided a method of operating a pressure relief valve, PRV, the method comprising providing a fluid to an inlet of the PRV, wherein the pressure of the fluid at the inlet applies an opening force to a plunger urging the plunger from a closed position, where fluid flow through the PRV is blocked, towards an open position, where fluid may flow through the PRV. The method further comprises applying a biasing force to the plunger via a biasing means of the PRV, the biasing means biasing the plunger towards the closed position, and applying a preload to the biasing means of the PRV via a variable preload means comprising a shape memory material thereby increasing the biasing force, wherein, when the temperature of the preload means increases above the transition temperature of the shape memory material, the shape of the preload means changes, thereby increasing the amount of preload on the biasing means.

BRIEF DESCRIPTION OF THE DRAWINGS

Certain examples of the disclosure will now be described, by way of example only, with reference to the accompanying drawings.

DETAILED DESCRIPTION

Whilst PRVs described herein are mainly described with regards to their use in aircraft, and particularly in aircraft engines and nacelles, it would be appreciated that the PRVs discussed herein may be utilised in other settings.

Figure 1A:
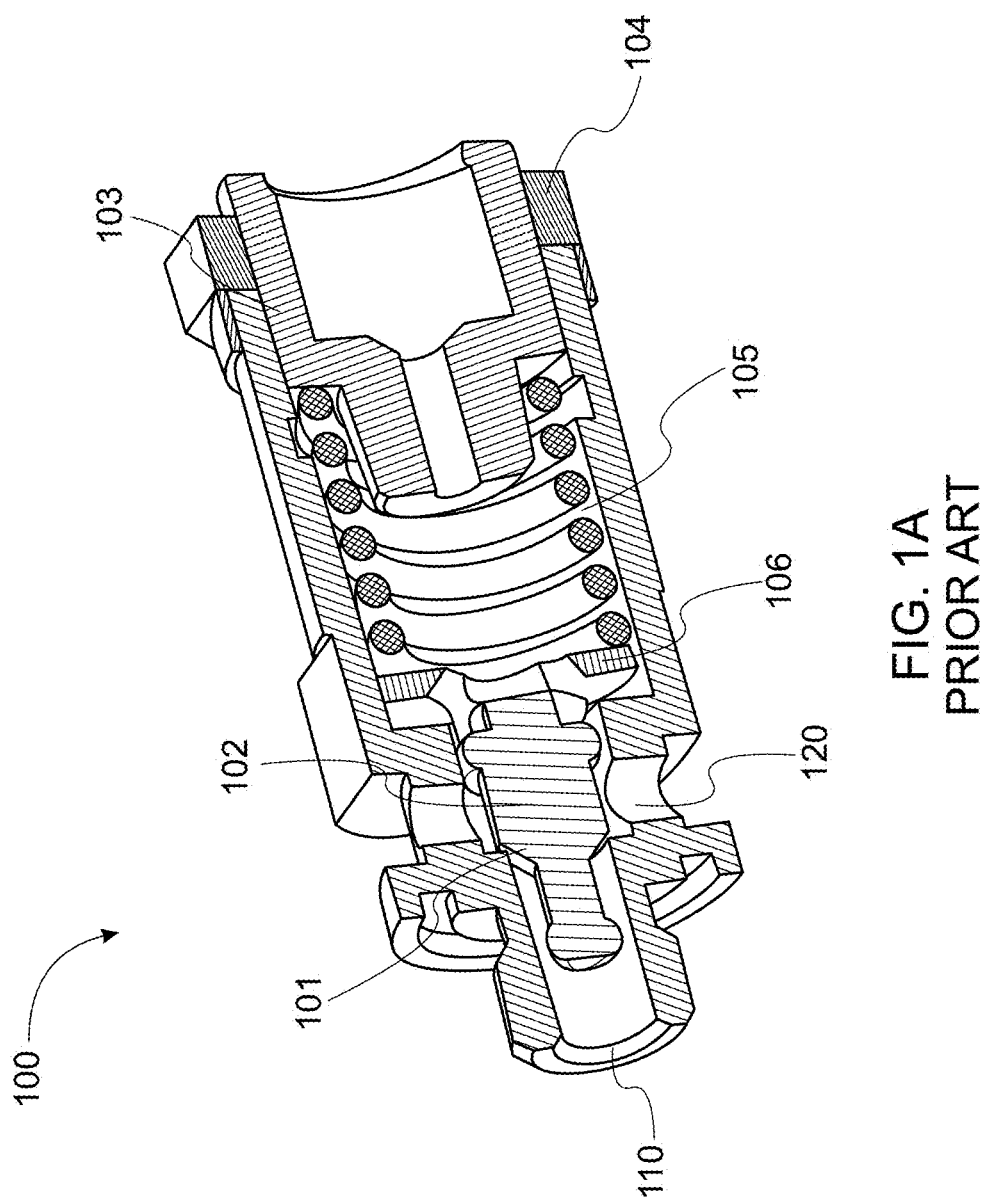
FIG. 1A shows a pressure relief valve (PRV).

As outlined above, PRVs are often utilised in widely varying conditions, and therefore should be robust to, for example, temperature changes. A simple mechanical PRV 100 may be seen in FIG. 1. PRV 100 comprises an inlet seat 101, a plunger 102, a bush 103, a nut 104, a spring 105, a plunger support 106, and an outlet port 120. PRV 100 is configured to selectively allow airflow between inlet 110 and outlet 120, depending on the pressure at the inlet 110. The spring is retained between the bush 103 and nut 104, and the plunger support 106, upon which the plunger 102 rests.

The plunger 102 and plunger support 106 is biased by the spring 105 against the inlet seat 101, such that the plunger 102 blocks the airflow between the inlet 110 and outlet 120, in its resting position. However, when there is provided a pressure at the inlet 110, there is a corresponding force applied on the plunger 102. When the pressure at the inlet 110 exceeds a predetermined amount, and therefore the force on the plunger 102 exceeds the biasing force of the spring 105, then the plunger will move from the inlet seat 101, thereby allowing fluid flow from the inlet 110, to the outlet 120, thereby providing pressure relief for the fluid at the inlet of the PRV 100. For example, the inlet 110 may be placed in fluid communication with a duct. Then, when the pressure of the fluid within the duct raises above a predetermined level, the force acting on the plunger 102 owing to the pressure within the duct overcomes the biasing force of the spring 105, thereby moving the plunger 102 from the inlet seat 101 and providing a fluid flow path between inlet 110 and outlet 120. As fluid escapes from the duct via the opened fluid flow path, the pressure within the duct would decrease, until the pressure is no longer sufficient to provide a sufficient force on the plunger 102 to overcome the spring force, such that the plunger 102 would move back to the inlet seat 101, thereby closing the fluid flow path.

The cracking pressure (i.e. the pressure at which the force on the plunger 102 from the fluid at the inlet 110 is great enough to overcome the biasing force of the spring 105, and therefore force the plunger 102 away from the inlet seat 101 such that fluid may flow from the inlet 110 to the outlet 120) may be customised, depending on the stiffness of the spring. For example, should a relatively high cracking pressure be desired, then a relatively stiff spring may be selected.

As the cracking pressure is directly related to the stiffness of the spring, the cracking pressure is strongly influenced by the operating temperature of the spring. Most springs change their physical properties quite dramatically with a change in temperature, and can become less stiff as the temperature increases. Therefore, at high temperatures, less force on the plunger 102 is required so as to move it from the inlet seat 101 so as to open up the fluid flow path from the inlet 110 to the outlet 120. Therefore, the cracking pressure of PRV 100 is strongly influenced by the operating temperature of the spring (and by proxy, the operating temperature of the PRV as a whole) as a result.

Figure 1B:
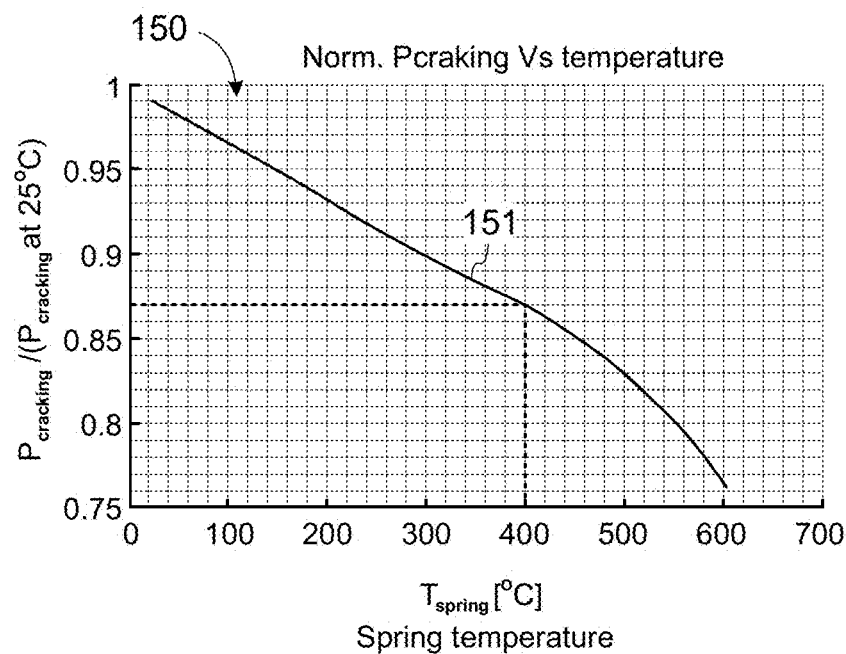
FIG. 1B shows the degradation of the cracking pressure of a PRV with an increase in temperature.

In many uses, such as in in aircraft engines and nacelles, the typical spring temperature range is from ambient temperature (e.g. around 25° C.), up to around 400° C. Experimental data shown in FIG. 1B shows that the cracking pressure varies by about 10-15% going from room temperature to 400° C. For example, as can be seen in graph 150, illustrating normalised cracking pressure of a PRV (such as PRV 100) against spring temperature. As the temperature of the spring increases, the cracking pressure of the PRV decreases. For example and as shown, at 400° C., the cracking pressure is decreased by 10 to 15% as compared to the cracking pressure of the same PRV at 25° C. Such a cracking pressure decrease with an increase in temperature shall be taken into account in the relief calibration phase. In other words, to ensure correct operating condition at high temperature, the preload of the spring at room temperature shall be increased, providing a higher biasing force from the spring, thereby leading to a higher cracking pressure for temperatures lower than 400° C.

Figure 1C:
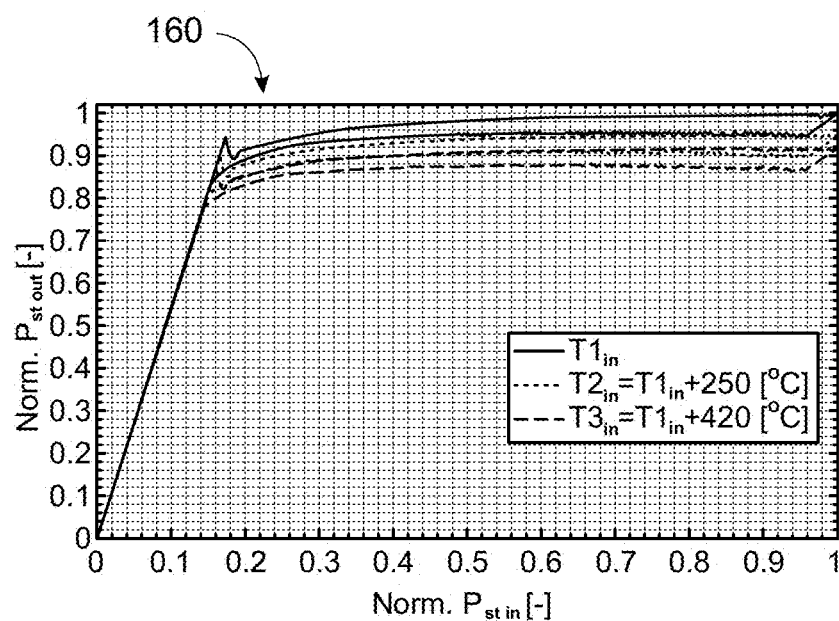
FIG. 1C shows a reduction in regulated outlet pressure in an anti-ice valve (AIV) owing to an increase in temperature.

A similar effect may be seen in FIG. 1C, which shows a graph 160 illustrating a regulation effect provided by a PRV (such as PRV 100) on an AIV's outlet pressure, plotting normalised outlet pressure against inlet pressure. As the temperature of the inlet fluid of the AIV increases, the outlet pressure of the AIV decreases, owing to the effect that the temperature has on the stiffness of the spring within the PRV. This pressure decay due to temperature is in the order of 10% of the upper limit of the regulating bands. This degradation of the spring's stiffness over the temperature results in a variation of the regulating pressure when used as a pressure regulating valve.

Figure 2A:
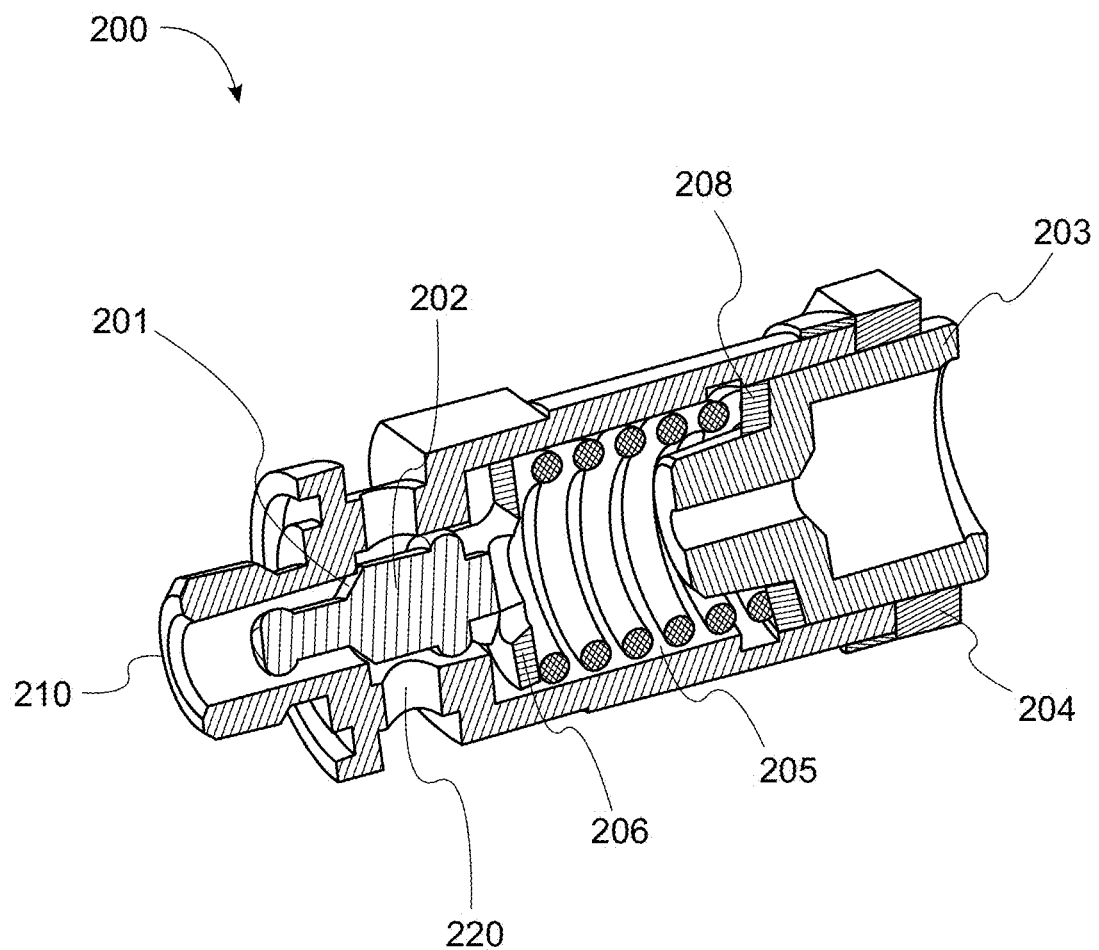
FIG. 2A shows a PRV utilising a variable preload means.

An improved PRV 200 that can account for a decrease in spring stiffness with temperature may be seen in FIG. 2A. PRV 200 is provided with an inlet 210, and an outlet 220. The inlet may be fluidly connected to a fluid source, such that the PRV may regulate the pressure of the fluid source. When in the closed position, the fluid flow path between the inlet 210 and outlet 220 is blocked by a plunger 202 which is biased a biasing means 205 to a closed position, where it blocks the fluid flow path. For example, the biasing means 205 may comprise a spring that is configured to apply a force to the plunger 202 via a plunger support 206, thereby biasing the plunger against the inlet seat 201, blocking flow between the inlet 210 and outlet 220, when in the closed position. The biasing means may be retained by a retaining means, for example bush 203 and nut 204, against which the biasing means may push so as to bias the plunger 202 towards the closed position, against the inlet seat 201.

As described above, PRV 200 is configured to block flow between the inlet 210 and the outlet 220, when the pressure at the inlet 210 is below a cracking pressure of the PRV. The pressure at the inlet 210 applies a force to the plunger 202 opposite to the biasing force provided by the biasing means 205 such that, when the pressure at the inlet 210 increases beyond a certain level (i.e. beyond the cracking pressure), then the force on the plunger 202 increases to an extent such that the plunger 202 is moved from the closed position (e.g. against the inlet seat 201) to an open position, thereby allowing fluid flow between the inlet 210 and outlet 220.

PRV 200 further comprises a variable preload means 208 comprising one or more shape memory materials. The variable preload means 208 is configured to apply a variable preload to the biasing means 205 depending on the operating temperature of the PRV 200. A shape memory material is a material that is configured to change its shape in a known manner at a known temperature. Some examples of such materials are Nickel/Titanium (nitinol) alloys, such as Ni 49.9/Ti 50.1, Ni 49.0/Ti 51, and/or Ni 48.0/Ti 52. Depending on the exact composition and heat treatment of the alloy, the material may provide a varying degree of elongation. For example, Ni 49.9/Ti 50.1 may exhibit between 4 and 6.5% elongation, depending on its heat treatment. Ni 49.0/Ti 51 may exhibit between 2.9 and 7.7% elongation. Ni 48.0/Ti 52 may provide from 4.45% elongation. Other shape memory materials may be selected, depending on the application (for example, depending on the desired amount of shape change, desired transition temperature etc.).

The above property may be utilised in order to counteract any change in the property of the biasing means 205 with temperature. For example, where the retaining means 205 is a spring, the variable preload means 208 may be configured to obtain a reduction of the installed length of the spring, when the operating temperature of the PRV 200 exceeds a threshold temperature. By reducing the installed length of the spring, the compression of the spring, and therefore the force exerted by the spring is increased, increasing the cracking pressure of the PRV 200, as compared to a similar PRV operating at the same temperature, without a preloading means. When the operating temperature decreases, the variable preload means 208 returns to its original shape.

In the example of FIG. 2A, the variable preload means 208 is provided as a washer at the base of the spring, between the spring and the bush. When the temperature of the washer increases above the transition temperature of the shape memory material of the washer, then the washer elongates, thereby compressing the spring and increasing the force provided thereby.

Depending on the application, the material and shape of the variable preload means 208 may be selected so as to provide a desired shape change at a desired temperature. For example, in a conservative approach, the goal may be to recover 65% of the degradation of the biasing means at 190° C. compared to room temperature conditions. As such, a material may be selected with a transition temperature at 190° C., and the shape (e.g. the length of the washer) selected so that the desired amount of shape change is achieved. In one example, a compression of the spring in the order of tenth of a millimeter may be required in order to allow for recovery of 65% of the temperature induced spring degradation. Therefore, the length of the washer may be selected, taking into account the degree of elongation of the material, so as to provide an extension of a tenth of a millimeter above the transition temperature.

Figure 2B:
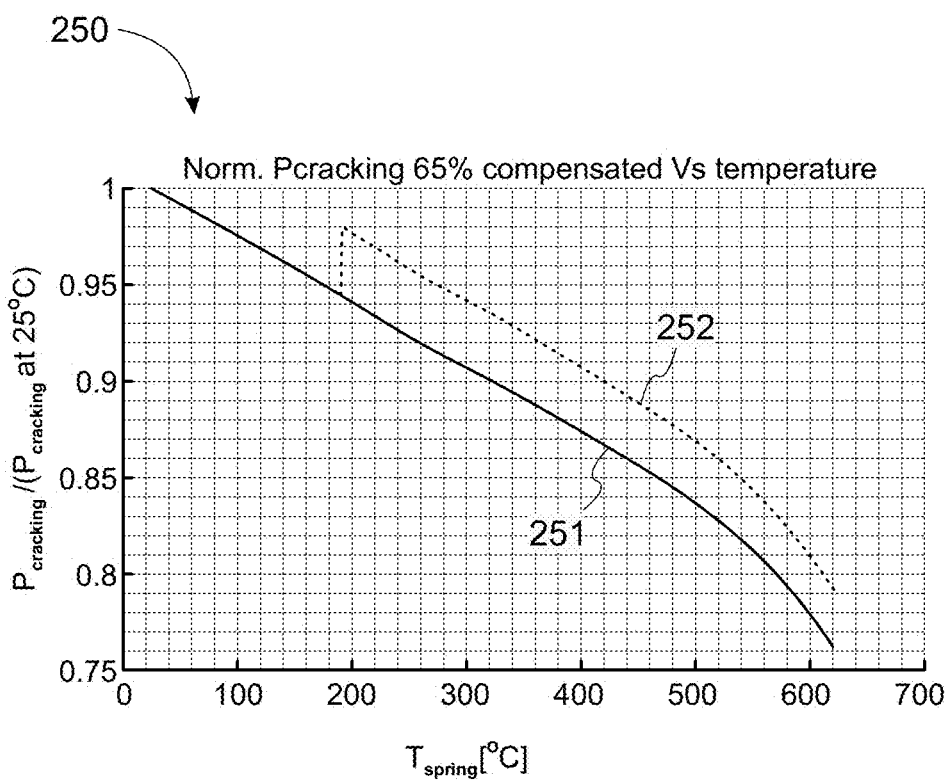
FIG. 2B shows the effect of a variable preload means on the cracking pressure of a PRV.

The effect of such a variable preload means 208 on the cracking pressure of the PRV 200 compared to a PRV without such a variable preload means (such as PRV 100) may be seen in FIG. 2B. The degradation of the cracking pressure with an increase in operating temperature of PRV 100 is shown by line 251, whereas the degradation of the cracking pressure with an increase in operating temperature of PRV 200, incorporating a variable preload means 208, is shown by line 251. As can be seen, as the operating temperature passes the transition temperature of the shape memory material of the variable preload means 208 (in this example, at around 190° C.), the shape memory material elongates, and therefore increases the preload on the spring. This allows for a recovery of the cracking pressure at temperatures above the transition temperature.

Figure 2C:
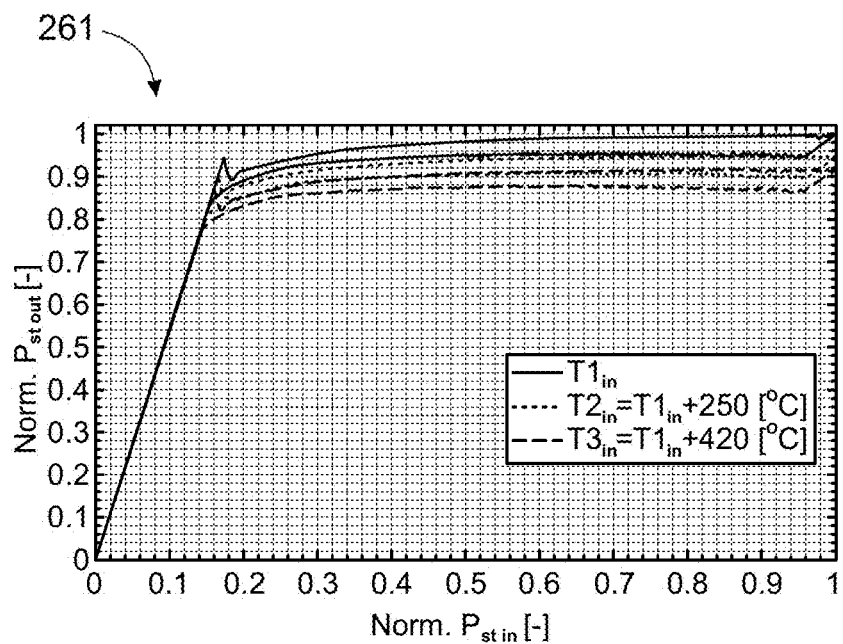
FIG. 2C shows the effect of a variable preload means on the regulation effect provided by a PRV on an AIV.
Figure 2C:
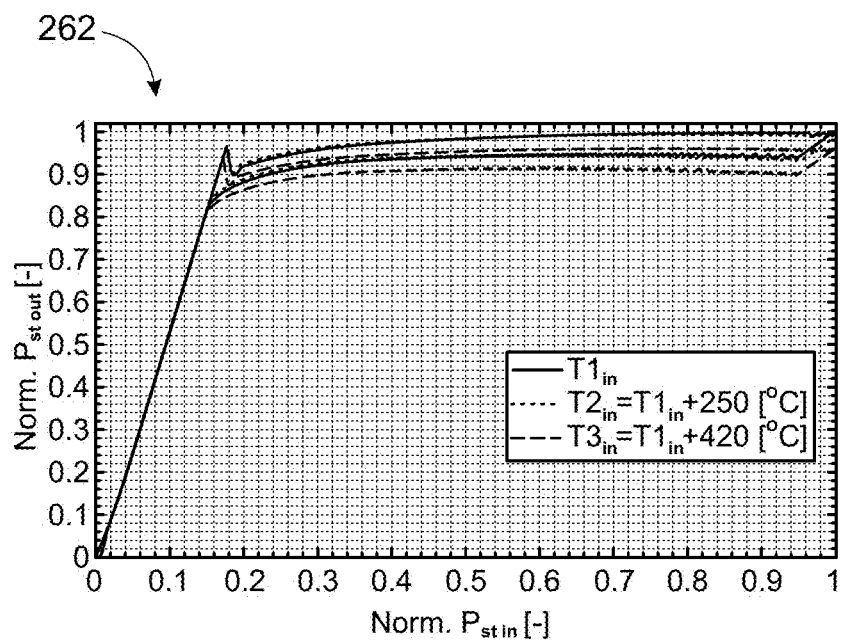

FIG. 2C shows graphs 261 and 262, illustrating a regulation effect provided by a PRV on an AIV's outlet pressure. Each graph plots normalised outlet pressure against inlet pressure. Graph 261 illustrates the effect of various operating temperatures for PRV 100 (i.e. without a variable preload means), and graph 262 illustrates the effect of various operating temperatures for PRV 200 (i.e. with a variable preload means 208). As can be seen, the thermal compensation provided by the variable preload means 208 on the biasing means of PRV 200 results in a reduction of the pressure decay due to temperature at valve outlet. In these examples, the pressure decay is reduced from around 10% of the upper limit of the regulating bands, to around 4% of upper limit of the regulating bands As a result of the compensation provided by the variable preload means 208, it is possible to provide a simple and light PRV that has consistent performance across a wide range of operating temperatures.

It will be appreciated by those skilled in the art that the disclosure has been illustrated by describing one or more specific examples, but is not limited to these examples; many variations and modifications are possible within the scope of the accompanying claims.

The invention claimed is:

1. A pressure relief valve (PRV) comprising an inlet and an outlet defining a fluid flow path therebetween;

a plunger, the plunger being moveable between a closed position and an open position, wherein, in the closed position, the plunger blocks the fluid flow path, and, in the open position, fluid may flow through the fluid flow path, the plunger being configured such that pressure at the inlet applies an opening force on the plunger, urging the plunger towards the open position;

a biasing means configured to apply a biasing force to the plunger, thereby biasing the plunger towards the closed position such that, when the biasing force is greater than the opening force, the plunger remains in the closed position, and when the opening force is greater than the biasing force and the plunger moves to the open position; and a variable preload means, the variable preload means configured to apply a preload to the biasing means so as to increase the biasing force;

wherein the variable preload means comprises a shape memory material such that, above a transition temperature of the shape memory material, the variable preload means is configured to change shape so as to apply a higher preload to the biasing means.

2. The PRV of claim 1, wherein the biasing means comprises a spring.

3. The PRV of claim 2, further comprising a retaining means configured to retain the spring.

4. The PRV of claim 3, wherein the retaining means comprises a bush and nut.

5. The PRV of claim 1, wherein the variable preload means is configured to elongate above the threshold temperature, thereby applying a higher preload to the biasing means.

6. The PRV of claim 5, wherein the variable preload means comprises a washer.

7. The PRV of claim 1, where the PRV is a PRV for use in high temperature pneumatic applications for aircraft engines and/or nacelles.

8. The PRV of claim 1, wherein the shape memory material comprises a Nickel/Titanium, nitinol, alloy.

9. The PRV of claim 8, wherein the shape memory material comprises at least one of: Ni 49.9/Ti 50.1, Ni 49.0/Ti 51, and Ni 48.0/Ti 52.

10. The PRV of claim 8, wherein the shape memory material has a transition temperature of 190° C.

11. The PRV of claim 1, wherein, in the closed position, the plunger is configured to seal against an inlet seat, thereby closing the fluid flow path.

12. The PRV of claim 1, further comprising:
a plunger support, wherein the biasing means is configured to bias against the plunger support.

13. A system comprising:
a duct, and
a PRV as claimed in claim 1, wherein the inlet is in fluid communication with the duct, such that when the pressure in the duct increases above a threshold pressure, the plunger is configured to move to the open position, thereby allowing fluid flow through the fluid flow path, releasing pressure within the duct.

14. A system comprising:
an anti-ice valve, and
a PRV as recited in claim 1;
wherein the inlet is in fluid communication with the AIV such that the PRV is configured to provide pressure regulation to the AIV.

15. A method of operating a pressure relief valve (PRV), the method comprising
providing a fluid to an inlet of the PRV, wherein the pressure of the fluid at the inlet applies an opening force to a plunger urging the plunger from a closed position, where fluid flow through the PRV is blocked, towards an open position, where fluid may flow through the PRV;
applying a biasing force to the plunger via a biasing means of the PRV, the biasing means biasing the plunger towards the closed position; and
applying a preload to the biasing means of the PRV via a variable preload means comprising a shape memory material thereby increasing the biasing force, wherein, when the temperature of the preload means increases above the transition temperature of the shape memory material, the shape of the preload means changes, thereby increasing the amount of preload on the biasing means.

* * * * *